US010783556B2

(12) United States Patent
Wu et al.

(10) Patent No.: US 10,783,556 B2
(45) Date of Patent: Sep. 22, 2020

(54) PRODUCT PUSHING METHOD

(71) Applicant: INDUSTRIAL TECHNOLOGY RESEARCH INSTITUTE, Hsinchu (TW)

(72) Inventors: Xuan-Wei Wu, Taichung (TW); Jia-Jang Tu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 661 days.

(21) Appl. No.: 14/968,578

(22) Filed: Dec. 14, 2015

(65) Prior Publication Data

US 2017/0109788 A1    Apr. 20, 2017

(30) Foreign Application Priority Data

Oct. 14, 2015 (TW) ............................. 104133768 A

(51) Int. Cl.
*G06Q 30/02* (2012.01)
*H04W 4/029* (2018.01)

(52) U.S. Cl.
CPC ..... *G06Q 30/0261* (2013.01); *G06Q 30/0255* (2013.01); *G06Q 30/0267* (2013.01); *H04W 4/029* (2018.02)

(58) Field of Classification Search
CPC ........... G06Q 30/0261; G06Q 30/0255; G06Q 30/0267
See application file for complete search history.

(56) References Cited

U.S. PATENT DOCUMENTS

| 7,930,204 | B1 | 4/2011 | Sharma et al. |
| 8,036,951 | B2 | 10/2011 | Kraft et al. |
| 2008/0249864 | A1 | 10/2008 | Angell et al. |

(Continued)

FOREIGN PATENT DOCUMENTS

| CN | 1677410 A | 10/2005 |
| CN | 102999859 A | 3/2013 |

(Continued)

OTHER PUBLICATIONS

Moody, M. (2015). "Analysis of Promising Beacon Technology for Consumers." Elon Journal of Undergraduate Research in Communications, 6(1). Retrieved from http://www.inquiriesjournal.com/a?id=1136 (Year: 2015).*

(Continued)

*Primary Examiner* — Katherine Kolosowski-Gager
(74) *Attorney, Agent, or Firm* — Muncy, Geissler, Olds & Lowe, P.C.

(57) ABSTRACT

A product pushing method and a product promotion system are provided. The method includes the following steps: recording an area as the user's current position when the time period of the user staying in the area is longer than a first threshold; obtaining at least one current product corresponding to the current position from a regional product database; obtaining at least one recorded product corresponding to at least one recorded position from the regional product database; obtaining at least one promotion portfolio from the product portfolio database according to the current product and the at least one record product; and sending the at least one promotion portfolio to the user.

13 Claims, 4 Drawing Sheets

(56) References Cited

U.S. PATENT DOCUMENTS

| | | | |
|---|---|---|---|
| 2011/0093339 A1* | 4/2011 | Morton | G06Q 30/02 705/14.58 |
| 2011/0106613 A1* | 5/2011 | Felt | G01C 21/00 705/14.46 |
| 2011/0310867 A1 | 12/2011 | Kennedy et al. | |
| 2012/0271715 A1* | 10/2012 | Morton | G06Q 30/0257 705/14.53 |
| 2013/0297422 A1 | 11/2013 | Hunter et al. | |
| 2014/0180790 A1* | 6/2014 | Boal | G06Q 30/0245 705/14.42 |
| 2014/0220883 A1 | 8/2014 | Emigh et al. | |
| 2014/0249928 A1 | 9/2014 | McMillan et al. | |
| 2015/0006320 A1 | 1/2015 | Goulart et al. | |
| 2016/0125467 A1* | 5/2016 | Scott | H04W 4/043 705/14.58 |

FOREIGN PATENT DOCUMENTS

| | | |
|---|---|---|
| CN | 103473688 A | 12/2013 |
| TW | 200933506 A | 8/2009 |
| TW | M409468 U | 8/2011 |
| TW | 201203146 A | 1/2012 |
| TW | I447661 B | 8/2014 |
| TW | 201447785 A | 12/2014 |

OTHER PUBLICATIONS

Jonathan L. Herlocker, Joseph A. Konstan, Al Borchers, and John Riedl, "*An Algorithmic Framework for Performing Collaborative Filtering*", Department of Computer Science and Engineering, University of Minnesota, p. 1-8 (Aug. 1999).

Steffen Rendle, Christoph Freudenthaler, Zeno Ganter and Lars Schmidt-Thieme, "*BPR:Bayesian Personalized Ranking From Implicit Feedback*", Machine Learning Lab, University of Hildesheim, Germany, p. 452-461 (Jun. 2009).

Yifan Hu, Yehuda Koren, and Chris Volinsky, "*Collaborative Filtering for Implicit Feedback Datasets*", AT&T Labs-Research, Folrham Park, NJ07932, Yahoo! Research, Haifa 31905, Israel, p. 1-10 (Dec. 2008).

Steffen Rendle, "*Factorization Machines*", Department of Reasoning for Intelligence, The Institute of Scientific and Industrial Research, Osaka University, Japan, p. 1-6. 2010 IEEE.

Badrul Sarwar, George Karypis, Joseph Konstan, and John Riedl, "*Item-Based Collaborative Filtering Recommendation Algorithms*", Grouplens Research Group/Army HPC Researcg Center, Department of Computer Science and Engineering, University of Minnesota, p. 1-11. (Apr. 2001).

Yehuda Koren, Robert Bell, and Chris Volinsky, "*Matrix Factorization Techniques for Recommender Systems*", www.groupes.polymti.ca/.../MATRIX-FAC, p. 1-26. (2009).

Tianqi Chen, Weiman Zhang, Qiuxia Lu, Kailong Chen, Zhao Zheng, and Young Yu, "*SVDFeature: A Toolkit for Feature-Based Collaborative Filtering*", Apex Data and Knowledge Management Lab, Shanghai Jiao Tong University, Journal of Machine Learning Research 13 (2012), , Submitted Oct. 2011; Published Dec. 2012, p. 3619-3622.

Office Action dated Mar. 25, 2019 in corresponding Application No. CN201511000623.X.

* cited by examiner

PRODUCT PUSHING METHOD

CROSS-REFERENCE TO RELATED APPLICATIONS

This non-provisional application claims priority under 35 U.S.C. § 119(a) on Patent Application No(s). 104133768 filed in Taiwan, R.O.C. on Oct. 14, 2015, the entire contents of which are hereby incorporated by reference.

TECHNICAL FIELD

The disclosure relates to a product pushing method for pushing product information according to the customer's behavior.

BACKGROUND

The advance of technology has caused changes in business models. A product portfolio is a sales promotion often used to attract customers. Product portfolios include, for example, a $39 extra-value breakfast promotion in convenience stores, a drink and snack promotion for a soccer season, and a beer and diaper portfolio that is famous in the field of big data. That combines the same category or different categories of products together in order to attract customers to buy more and to create more business opportunities.

Because of the limitation in physics, physical stores nowadays can not dynamically provide an individual customer with personalized sales plans according to the customer's behavior pattern. Usually, these stores paste product menus on shop shelves or directly send sales promotion menus to their customers. However, because customers cannot directly see their desires, such a promotion method cannot efficiently attract customers to visit these stores and even loss some potential customer groups.

SUMMARY

According to one or more embodiments, a product pushing method includes the following steps. When a user stays in an area for a time period longer than a first threshold, the area is recorded to be a current position of the user. Acquire at least one current product related to the current position from a regional product database. Acquire at least one recorded product from a regional product database according to at least one recorded position related to the user. Acquire at least one promotion portfolio from a product portfolio database according to the current product and the at least one recorded product, and send the at least one promotion portfolio to the user.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
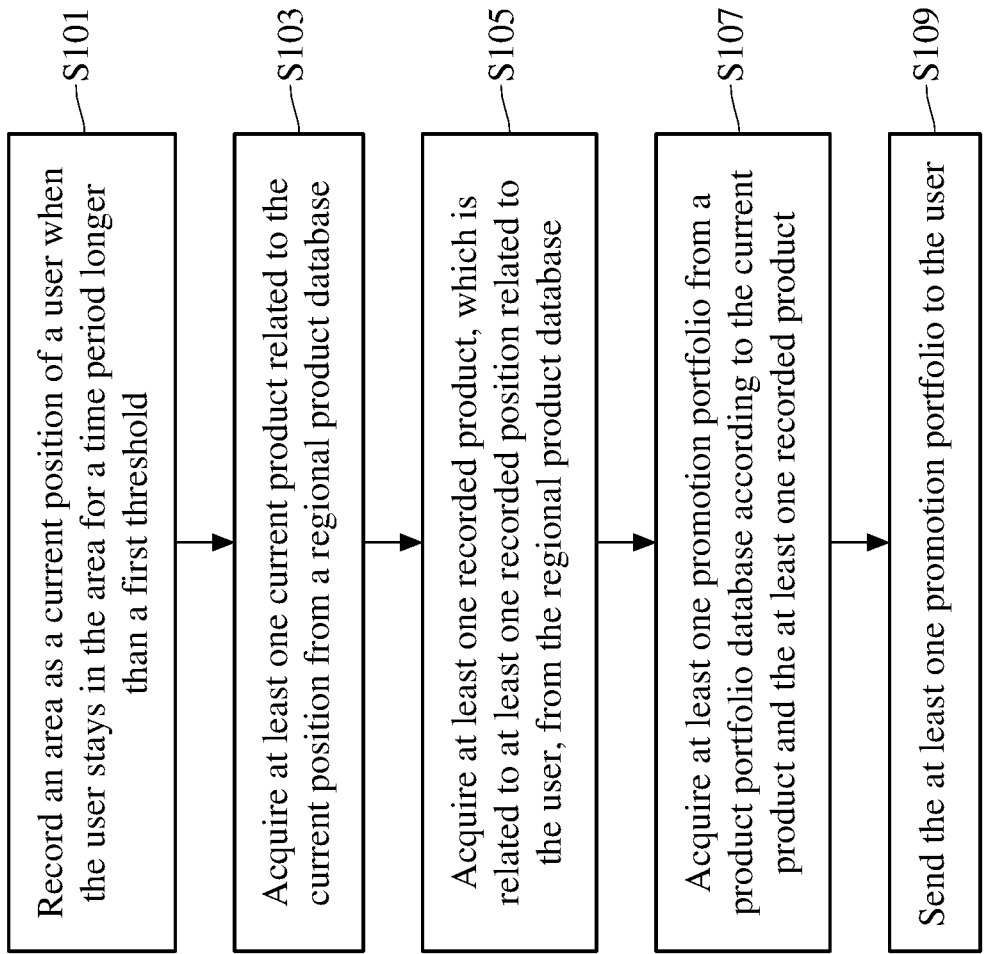
FIG. 1 is a flow chart of a product pushing method in an embodiment.

Please refer to FIG. 1. FIG. 1 is a flow chart of a product pushing method in an embodiment. The product pushing method includes the following steps. In step S101, when a user stays in an area for a time period longer than a first threshold, the area is recorded to be a current position of the user. The current position is performed by deciding the area using a positioning system, and the positioning system is at least one selected from a group consisting of a global positioning system (GPS), a wireless network positioning system and an iBeacon positioning system. In step S103, at least one current product related to the current position is acquired from a regional product database. Then, in step S105, at least one recorded product related to at least one recorded position related to the user is acquired from a regional product database. In step S107, at least one promotion portfolio is acquired from a product portfolio database according to the current product and the at least one recorded product. In step S109, the at least one promotion portfolio is sent to the user. Note that the modules and databases in the disclosure are physical circuits, the module is, for example, a computing device, and the database is, for example, a hard disk drive or a memory. Alternately, the modules and databases in the disclosure are carried out by executive programs or storage structures defined by software.

Figure 2:
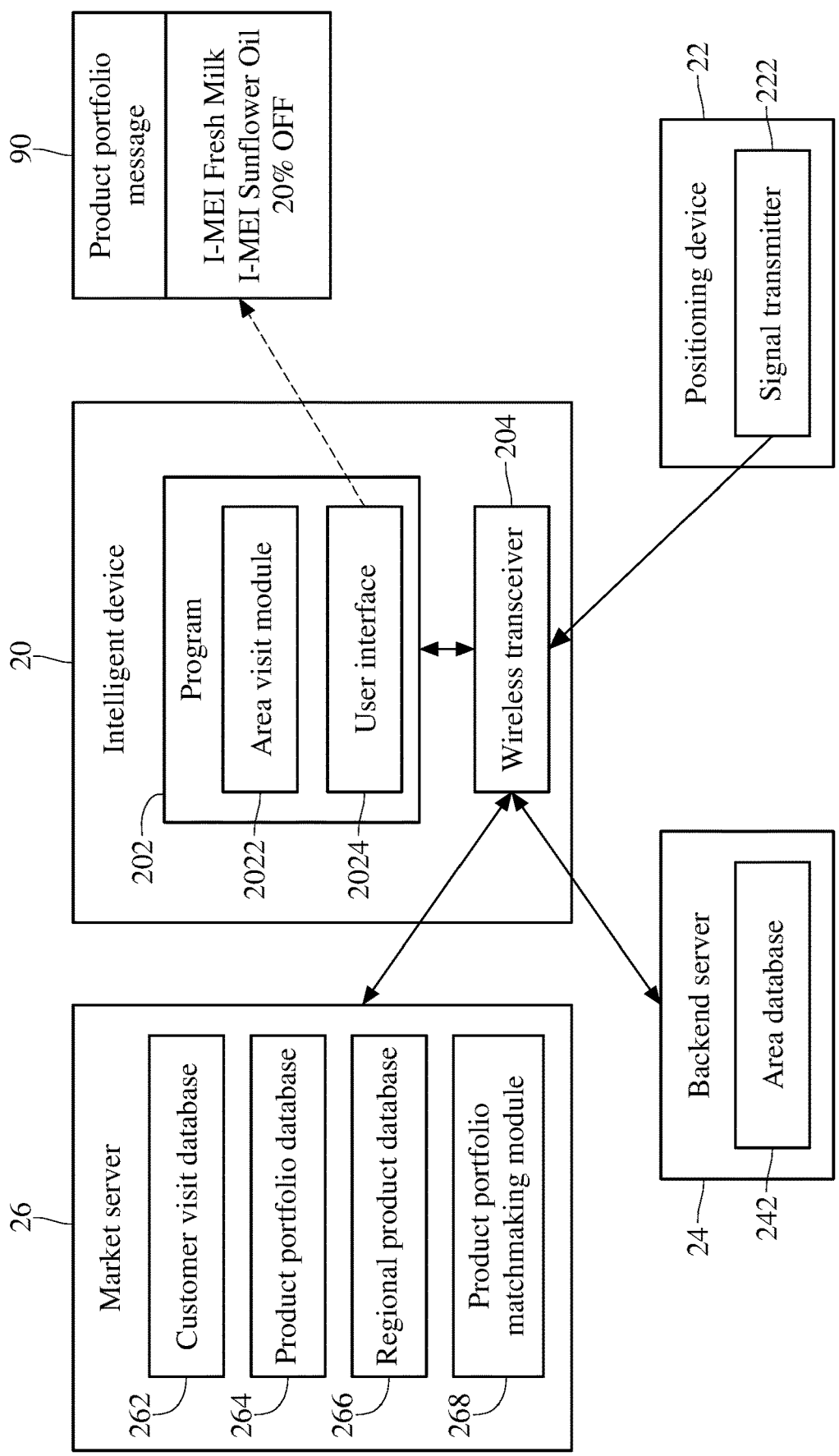
FIG. 2 is a functional block diagram of a product promotion system in an embodiment.

In accordance with FIG. 1, the disclosure also provides a product promotion system to carry out the aforementioned product pushing method. Please refer to FIG. 1 and FIG. 2. FIG. 2 is a functional block diagram of a product promotion system in an embodiment. A product promotion system 2 includes an intelligent device 20, a positioning device 22, a backend server 24, and a market server 26. The intelligent device 20 executes a program 202. The program 202 provides an area visit module 2022 and a user interface 2024. The intelligent device 20 includes a wireless transceiver 204. The positioning device 22 includes a signal transmitter 222. The backend server 24 includes an area database 242. The market server 26 is known as a product promotion device and includes multiple databases for storing information about customers or products. In this embodiment, the market server 26 includes a customer visit database 262, a product portfolio database 264, a regional product database 266, and a product portfolio matchmaking module 268. The persons skilled in the art should understand that other embodiments of databases in the market server 26 may be contemplated. Moreover, the disclosure has no limitation in functional components in a respective server or device. The intelligent device 20 communicates with the positioning device 22, the backend server 24 and the market server 26 via the wireless transceiver 204 and provides the user with a product portfolio message 90 via the user interface 2024.

The intelligent device 20 is, for example, not limited to a smart phone or a tablet computer held by a customer (referred to as the user) visiting a market. All those, which can execute the program 202 and communicate with the positioning device 22, the backend server 24 and the market server 26, can be used as the intelligent device 20. The program 202 is, for example, not limited to an application (APP) associated with a market or a mall. The area visit module 2022 provided by the program 202 determines whether the intelligent device 20 (i.e. the customer), e.g. a smart phone, a tablet computer or the like, stays in a transmission range of the positioning device 22. The user interface 2024 provided by the program 202 supports the interaction with customers, and the interaction is, for example, not limited to displaying the product portfolio message 90 to a customer. The wireless transceiver 204 is, for example, not limited to receive or transmit signals in the standard of low power consumption Bluetooth (BT), wireless fidelity (WIFI), global positioning system (GPS) or a combination thereof.

The positioning device 22 uses the signal transmitter 222 to tell the intelligent device 20 which area the intelligent device 20 stays in. In an embodiment, the positioning device 22 is disposed on a shop shelf, and the signal transmitter 222 sends out a positioning signal that has a first power value and carries information about the first power value and the device code of the positioning device 22. When a customer brings the intelligent device 20 and is in the transmission range of the positioning device 22, the intelligent device 20 will receive a positioning signal having a second power value lower than the first power value. In addition to sensing the second power value of the current positioning signal, the intelligent device 20 also extracts the first power value from the current positioning signal. The program 202 employs the area visit module 2022 to obtain a current position of the intelligent device 20 according to the first power value, the second power value and the device code of the positioning device 22. The so-called current position is, for example, not limited to an area covered by the transmission range of the positioning device 22, or a current coordinate of the user. For the illustration purpose, one or more embodiments with respect to the area covered by the transmission range of the positioning device 22 will be described later.

Alternatively, the program 202 determines a distance between the intelligent device 20 and the positioning device 22 according to the difference between the first power value and the second power value and looks up the area, which the positioning device 22 is located in, or advance information in the backend server 24 or the market server 26 according to the device code in order to know the current position of the customer.

The above description is exemplary, and the disclosure has no limitation in how the program 202 determines the current position of the intelligent device 20, i.e. the current position of the customer, specified by the positioning signal. In practice, a market is disposed with multiple positioning devices 22 on different product shop shelves. Specifically, on a shop shelf there is at least one positioning device 22. Accordingly, the intelligent device 20, according to the information carried by signals provided by the positioning device 22, employs the program 202 to determine or look up which shop shelf corresponds to the current position of the customer or which product area the customer stays in.

The backend server 24 includes an area database 242. In accordance with the distribution of the positioning devices 22 in a market, the area database 242 stores the device codes of the positioning devices 22 and area data corresponding to the device codes. The intelligent device 20 then, according to the device code of the positioning device 22 indicated by the positioning signal, looks up an actual position of the positioning device 22 in the market from the area database 242, so as to obtain the current position of the intelligent device 20. In an embodiment, the intelligent device 20, according to the positioning signal provided by the positioning device 22, searches for the product area, where the intelligent device 20 is, in the backend server 24 and sets this product area to be the current position. In another embodiment, the intelligent device 20, according to the positioning signal provided by the positioning device 22, searches for information about the product area in the backend server 24 and employs the program 202 to determine the area, where the intelligent device 20 is, and set it as the current position. The above description is exemplary, and the disclosure will have no limitation in that such a determination is carried out by the intelligent device 20 or the backend server 24.

The market server 26 includes a customer visit database 262, a product portfolio database 264, a regional product database 266 and a product portfolio matchmaking module 268. The customer visit database 262 stores recorded positions of customers, and a recorded position is a certain shop shelf or product area which a certain customer has ever gone to. In other words, a recorded position is a past current position of a customer. When a customer leaves a product area, the current position is recorded to be one of at least one recorded position related to the user. In an embodiment, each of the intelligent devices 20 corresponds to a customer identifier, and the customer visit database 262 can use the customer identifier to flag any shop shelf, in front of which the customer has ever stopped, and flag one or more products on the shop shelf. For example, the customer visit database 262 stores information indicating that a customer of a customer identifier A13-25 has ever visited a flour area, a cooking oil area and a fresh milk area.

In an embodiment, when a customer stays in the transmission range of the positioning device 22 for more than 1 minute, the program 202 determines that this customer is in the transmission range of the positioning device 22, and sends the market server 26 the related information, such as a distance between the customer and a certain shop shelf or a time period that the customer stopped in front of a certain shop shelf, for storage or analysis. The disclosure exemplifies the above description of how to determine whether the customer is staying in front of a certain shop shelf, but a person skilled in the art can design it according to the disclosure and actual requirements.

The product portfolio database 264 stores product portfolios and sales plans thereof. In an embodiment, the product portfolio database 264 stores, for example, but not limited to, product information that the portfolio including Ruisui Milk and I-MEI Sunflower Oil has a discount of 20 percent off. The regional product database 266 stores information about products on each of product areas. The regional product database 266 stores, for example, but not limited to, information about I-MEI Fresh Milk, Fresh Delight Fresh Milk and packaged fresh milk of other brands in a milk area of the market. The product portfolio matchmaking module 268 collects information sent from the smart phone of the customer, and then generates one or more product portfolios, which the customer may be interested in, in the customer visit database 262, the product portfolio database 264 and the regional product database 266 according to the collected information. The related operation is described below with respect to FIG. 3.

Figure 3:
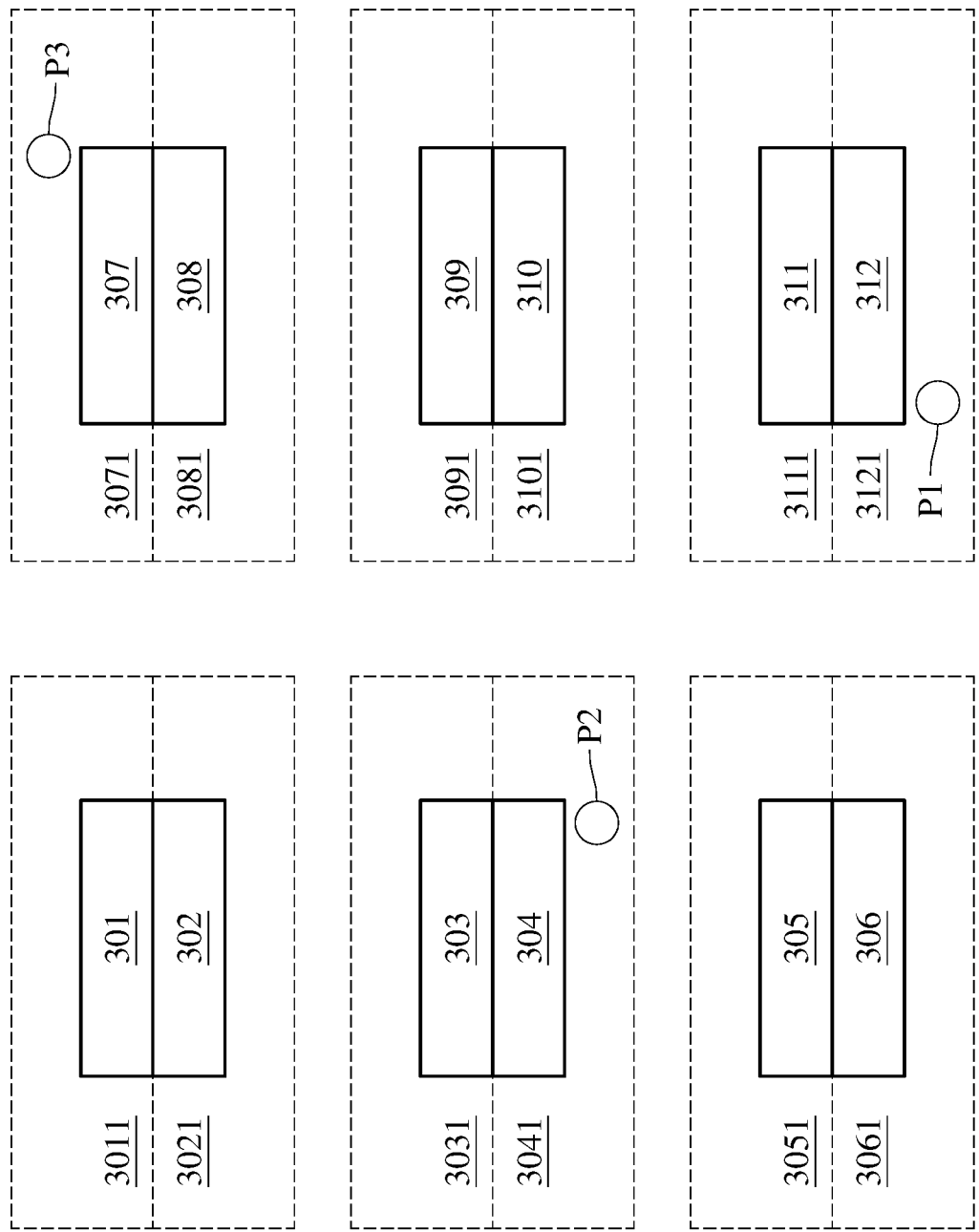
FIG. 3 is a schematic view of the position relationship between a customer and shop shelves in an embodiment.

FIG. 3 is a schematic view of the position relationship between a customer and shop shelves in an embodiment. In the drawing, shop shelves 301 to 312 are shown, and each of the shop shelves 301 to 312 has one or more aforementioned positioning devices thereon. The one or more positioning devices on a shop shelf cause one of product areas 3011 to 3121 shown in the drawing. The disclosure has no limitation on the shape of a shop shelf, the shape of a product area, and the number of positioning devices on a shop shelf Three circles shown in the drawing represent stop points P1, P2 and P3 of a customer respectively. The stop points P1, P2 and P3 correspond to the product areas 3121, 3041 and 3071 respectively. In an example, the product area 3121 corresponds to a flour area in a market, the product area 3041 corresponds to a cooking oil area in the market, and the product area 3071 corresponds to a fresh milk area in the market.

In an exemplary situation, if a user stays in the product area 3121 for more than a first threshold, the product area 3121 will be defined as a current position of the user. The first threshold is, for example, one minute or another preset period. This situation means that the user may be interested in packaged flour on the shop shelf 312 corresponding to the product area 3121, so the product, packaged flour, on the shop shelf 312 is defined as a current product. Also, if the user stops in front of the shop shelves 304 and 307 for more than the first threshold during the previous visits to this market or during the current visit to the market, the product areas 3041 and 3071 will be defined as recorded positions and stored in the market server 26. Then, in view of the recorded positions related to the user, the user may be interested in packaged cooking oil the shop shelf 304 or packaged fresh milk on the shop shelf 307, and the products on the shop shelves 304 and 307 are defined as recorded products. Herein, the market server 26 can search for any promotion portfolio covering the products on the shop shelves 312 and 304 or search for any promotion portfolio covering the products on the shop shelves 312 and 307. In other words, the market server 26 can search for any promotion portfolio covering packaged flour and cooking oil, or search for any promotion portfolio covering packaged flour and fresh milk. When the market server 26 finds out such one or more promotion portfolios therein, the market server 26 sends information about the one or more promotion portfolios to the intelligent device 20. Then, the user interface 2024 provided by the program 202 can present this information to the user.

Figure 4:
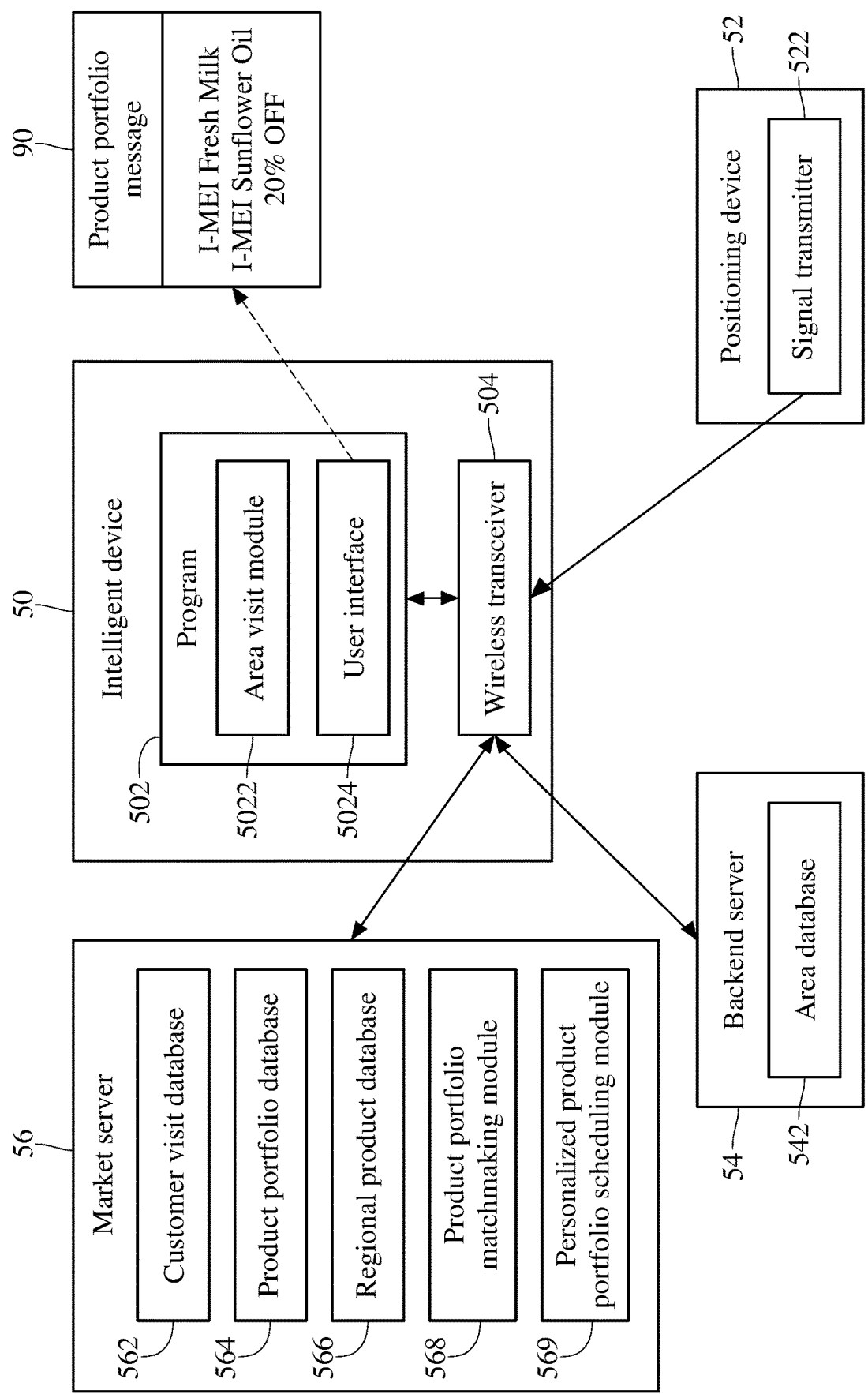
FIG. 4 is a functional block diagram of a product promotion system in another embodiment.

Please refer to FIG. 4. FIG. 4 is a functional block diagram of a product promotion system in another embodiment. Most of components in FIG. 4 have the same interactions therebetween as the corresponding components in FIG. 2. However, different from the market server 26 in the product promotion system 2 shown in FIG. 2, the market server 56 in the product promotion system 5 shown in FIG. 4 further includes a personalized product portfolio scheduling module 569. When the product portfolio matchmaking module 568 generates multiple product portfolios, the personalized product portfolio scheduling module 569 arranges the product portfolios according to the past behavior data of a user. The program 502 then promotes the arranged product portfolios to the user in order or lists them for the user. The disclosure has no limitation in how the program 502 presents the arranged product portfolios to the user, and all those, which can arrange the product portfolios according to the past behavior data of the user, are covered by the disclosure.

A promotion portfolio includes at least one product and at least one sales plan. The product promotion system 5 evaluates one or more products and one or more sales plans in a promotion portfolio respectively so every product and/or every sales plan has a respective score (referred to as an appraisal). Then, the product promotion system 5 statistically computes, e.g. weights or averages, these scores according to the past behavior data of a user in order to determine one or more promotion portfolios which the user may be interested in. In an embodiment, the product promotion system 5 further uses a cost function to train a suitable customer parameter vector, product parameter vector and discount parameter vector for the above evaluation. For example, the cost function is associated with, not limited to, one or more products the customer has ever purchased, a number of times of purchasing the same product, one or more sales campaigns of interest, or a combination thereof.

In an embodiment, the promotion portfolios correspond to sales plans respectively. The sales plan is, for example, not limited to a discount activity or giving gifts or reward points. The personalized product portfolio scheduling module 569 arranges the sales plans according to a past purchase record of the user and sends the promotion portfolios to the user according to the arrangement of the sales plans. For instance, if a user likes products at a discount, it means that the user may be more interested in discount plans. Therefore, a promotion portfolio including a discount plan has a higher priority in the sequence of all promotion portfolios so that a user can learn about this promotion portfolio more easily.

In another embodiment, a time period that the user stays at a current position or that the user stays is currently located in a product area, will be recorded and defined as a current visit time. The current visit time is, for example, not limited to a current time point minus a time point that the user enters into the product area. This can be designed according to actual requirements and will not be limited by the aforementioned description. Correspondingly, the market server 56 also stores information about at least one recorded visit time period corresponding to at least one recorded position. The personalized product portfolio scheduling module 569 arranges the promotion portfolios according to the current visit time period and the at least one recorded visit time period. In details, the current visit time period corresponds to the current position and also corresponds to the current product, and the recorded visit time period corresponds to the recorded position and also corresponds to the recorded product. A longer visit time period represents that a user may be more interested in a product herein. Therefore, when a product in a promotion portfolio corresponds to a relatively long visit time period, this promotion portfolio will have a relatively high priority among all promotion portfolios and the user may learn it more easily.

In yet another embodiment, each of the promotion portfolios includes a first product and a second product. In this embodiment, the personalized product portfolio scheduling module 569 evaluates a score of each of the promotion portfolios according to at least one previous purchase record of the user, arranges the promotion portfolios according to the scores, and sends the promotion portfolios to the user in order according to the arrangement of the promotion portfolios. The first product is a product of a certain brand among current products, and the second product is a product of a certain brand among recorded products. In other words, the first product is, for example, I-MEI Fresh Milk among packaged fresh milk, and the second product is, for example, I-MEI Sunflower Oil among packaged sunflower oil. In this embodiment, the embodiment further considers the brands or numbers of products actually purchased by the user for an accurate determination.

Moreover, when the at least one promotion portfolio is being sent to the user, the product pushing method further includes acquiring the recorded position corresponding to the promotion portfolio; marking the current position and the recorded position on a map; and sending the marked map and the promotion portfolio to the user. In other words, the product pushing method and the product promotion system in the disclosure can guide the user to a recorded position from a current position according to the recorded past position and the current position of the user so that the user may find out products of interest faster. In an example in real life, the COSTCO warehouses in Taipei and Hsinchu may have differences in furnishing and decoration therebetween. When a user who has only visited and shopped at the COSTCO warehouse in Taipei but has never visited the COSTCO warehouse in Hsinchu, visits the COSTCO warehouse in Hsinchu for the first time, since the user's one or more recorded positions in the COSTCO warehouse in Taipei will correspondingly be shown in the map related to the COSTCO warehouse in Hsinchu, the user may know how to go toward the product of possible interest in this warehouse and then find out it more easily.

In addition, the product promotion system 2 is further connected to one or more cash registers in a market and receives one or more purchase records related to a user from the one or more related cash registers. Also, a cash register in the market may be disposed in a cashier area corresponding to the positioning device 22. When the user stays in the cashier area, one or more products paid by the user will be written into a purchase record related to the user. This purchase record is stored in the intelligent device 20, the market server 26 or a combination thereof in an embodiment.

Specifically, in an embodiment, when the user uses a membership card in the cashier area during checkout and the membership number has not linked to the intelligent device 20 of the user, the positioning device 22 senses that the intelligent device 20 is in the cashier area. Therefore, it will be considered that the intelligent device 20 is held by the member who is checking out, and then the intelligent device 20 of the user can link to the purchase record of the user. In another embodiment, if a user having no membership in this market uses the device code of the intelligent device 20 to be a customer identifier, the intelligent device 20 of the user and the purchase record of the user can be linked together. In yet another embodiment, when a user uses a membership card during checkout and the intelligent device 20 of the user has linked to the membership number, the intelligent device 20 or the market server 26 can learn what the user has bought, according to the purchase record. In this embodiment, since the intelligent device 20 of the user has linked to the membership number, the intelligent device 20 is still capable of linking to the purchase record of the user without the positioning device 22.

Through the link between the intelligent device 20 and the purchase record of the user, the personalized product portfolio scheduling module 569 can arrange the product portfolios according to the purchase record. For example, the personalized product portfolio scheduling module 569 enhances a weighting coefficient for a product of a certain brand that the user has purchased ever. Alternately, maybe the user purchased a certain category of products will not purchase this category of products again in the near feature, so within a preset time, the personalized product portfolio scheduling module 569 may reduce the weighting coefficient of one or more brands of products purchased by the user. It can be designed according to actual requirements and will not be limited by the aforementioned description.

As set forth above, the disclosure determines the position of a user in a shop in order to conjecture which products the user may be interested in. Meanwhile, the disclosure finds out multiple products of interest according to a behavior history to generate one or more product portfolios the user may require, and then promotes this related product information to the user. Therefore, the disclosure may fulfill personalized promotion messages for physical stores to create more business opportunities and thus, may have better practicality.

What is claimed is:

1. A product pushing method, with the product pushing method performed by a product promotion system comprising an intelligent device of a user, a positioning device, a backend server, and a market server, the product pushing method comprising:
   determining, via the intelligent device, whether the intelligent device stays in an area for a current visit time period that is longer than a first threshold and recording the current visit time period when the current visit time period is longer than the first threshold;
   transmitting, via the positioning device, a positioning signal to the intelligent device in the area when the intelligent device is in a transmission range of the positioning device;
   transmitting, via the intelligent device, the positioning signal to the backend server;
   determining, via the backend server, a current position according to the positioning signal and sending the current position to the intelligent device;
   transmitting, via the intelligent device, the current visit time period and the current position to the market server;
   determining, via the market server, a current product according to the current position;
   wherein the market server stores a plurality of different recorded positions, a plurality of recorded products corresponding to the recorded positions, and a plurality of recorded visit time periods corresponding to the recorded positions, the recorded positions are past positions where the intelligent device has been;
   determining via the market server, a plurality of promotion portfolios according to the current visit time period, the current product corresponding to the current visit time period, the recorded products and the recorded visit time periods corresponding to the recorded products, wherein each of the promotion portfolios has the current product or one of the recorded products;
   arranging, via the market server, the promotion portfolios according to the current visit time period and the recorded visit time periods in order, wherein when the current product or one of the recorded products in one of the promotion portfolios corresponds to a relatively long visit time period, the one of promotion portfolios which corresponds to a relatively long visit time period has a relatively high priority among all of the promotion portfolios;
   sending, via the market server, all of the promotion portfolios to the intelligent device; and
   executing a program by the intelligent device, wherein the program provides a user interface and the product portfolios arranged by the market server is shown in the user interface in order.

2. The product pushing method according to claim 1, wherein recording the current position is performed by deciding the area using a positioning system, and the positioning system is at least one selected from a group consisting of a global positioning system (GPS), a wireless network positioning system and an iBeacon positioning system.

3. The product pushing method according to claim 1, wherein recording the current position comprises:
   recording an entering time that the intelligent device enters into the area; and
   obtaining a time period that the intelligent device stays in the area, by subtracting the entering time from a current time when the intelligent device stays in the area.

4. The product pushing method according to claim 1, further comprising:
   determining whether the intelligent device stays in a cashier area; and
   writing at least one paid product into a purchase record related to the intelligent device when the intelligent device stays in the cashier area.

5. The product pushing method according to claim 1, further comprising:
   recording the area to be the recorded position related to the intelligent device when the intelligent device leaves the area.

6. The product pushing method according to claim 1, wherein sending the promotion portfolios to the intelligent device further comprises:
   marking the current position and the recorded position on a map; and
   sending the marked map and the at least one promotion portfolio to the intelligent device.

7. A product promotion device for communicating with an intelligent device of a user via a wireless transceiver of the intelligent device, comprising:
   a positioning device configured to sending a positioning signal to the intelligent device;
   a backend server configured to determine a current position according to the positioning signal and send the current position to the intelligent device; and
   a market server configured to store a plurality of different recorded positions, a plurality of recorded products corresponding to the recorded positions and a plurality of recorded visit time periods corresponding to the recorded positions;
   wherein the intelligent device transmits the current position and a current visit time period corresponding to the current position to the market server, the market server determines a plurality of promotion-portfolios according to the current visit time period, the current position, the recorded positions, and the recorded visit time periods, each of the promotion portfolios has the current product or one of the recorded products, the recorded positions are past positions where the intelligent device has been, the market server arranges the promotion portfolios according to the current visit time period and the recorded visit times in order, wherein when the current product or one of the recorded products in one of the promotion portfolios corresponds to a relatively long visit time period, the one of promotion portfolios which corresponds to a relatively long visit time period has a relatively high priority among all of the promotion portfolios, and the market server sends all of the promotion portfolios to the intelligent device, and the intelligent device executes a program, wherein the program provides a user interface and the product portfolios arranged by the market server is shown in the user interface in order.

8. The product promotion device according to claim 7, wherein the market server further comprises:
   a customer visit database configured to store the current position and the recorded position;
   a product portfolio database configured to store the promotion portfolio comprising at least one product;
   a regional product database configured to store correlations between areas and products in a market; and
   a product portfolio matchmaking device configured to acquire the current product and the recorded product from the regional product database according to the current position and the recorded position and check whether the promotion portfolio comprises the current product and the recorded product.

9. A product promotion system, comprising:
   an intelligent device configured to record an area to be a current position of an intelligent device of a user and a current visit time period corresponding to the current position when the intelligent device stays in the area for the current visit time period, which is longer than a first threshold; and
   a product promotion device comprising:
   a customer visit database configured to store the current position, the current visit time, a plurality of different recorded positions related to the intelligent device, and a plurality of recorded visit time periods corresponding to the recorded positions wherein the recorded positions are past positions where the intelligent device has been;
   a regional product database configured to store correlations between different areas and products in a market wherein the customer visit database is capable of acquiring a current product related to the current position from the regional product database and acquiring a plurality of different recorded products related to the recorded positions from the regional product database; and
   a product portfolio matchmaking device configured to acquire a plurality of promotion portfolios related to the current product corresponding to the current visit time period and the recorded products corresponding to the recorded products from a product portfolio database, each of the promotion portfolios has the current product or one of the recorded products;
   a personalized product portfolio scheduling device configured to arrange the promotion portfolios according to the current visit time period and the recorded visit time periods in order, wherein when the current product or one of the recorded products in one of the promotion portfolios corresponds to a relatively long visit time period, the one of promotion portfolios which corresponds to a relatively long visit time period has a relatively high priority among all of the promotion portfolios,
   the personalized product portfolio scheduling device is further configured to send all of the promotion portfolios to the intelligent device when the product portfolio matchmaking device acquires the promotion portfolios, and the intelligent device executes a program, wherein the program provides a user interface and the product portfolios arranged by the product portfolio matchmaking device is shown in the user interface in order.

10. The product promotion system according to claim 9, wherein the intelligent device decides the area according to a positioning system, which is at least one selected from a group consisting of a global positioning system, a wireless network positioning system and an iBeacon positioning system.

11. The product promotion system according to claim 9, wherein the intelligent device records an entering time that the intelligent device enters into the area, and the intelligent device calculates the time period, for which the intelligent device stays in the area, by subtracting the entering time from a current time when the intelligent device stays in the area.

12. The product promotion system according to claim 9, wherein the intelligent device further determines whether the intelligent device stays in a cashier area according to the current position, and when the intelligent device stays in the cashier area, the intelligent device writes at least one paid product into a purchase record.

13. The product promotion system according to claim 9, wherein when the intelligent device leaves the area, the product promotion system records the area to be the recorded position related to the intelligent device.

\* \* \* \* \*